United States Patent [19]

Hini

[11] 4,041,371
[45] Aug. 9, 1977

[54] ARRANGEMENT FOR THE GENERATION OF ELECTRICAL SIGNALS BY MEANS OF MAGNETIC FIELD-DEPENDENT SEMICONDUCTOR COMPONENTS

[75] Inventor: Paul Hini, Barschenweg, Germany

[73] Assignee: Siemens Aktiengesellschaft, Munich, Germany

[21] Appl. No.: 572,890

[22] Filed: Apr. 30, 1975

[30] Foreign Application Priority Data

May 15, 1974   Germany .............................. 2423500

[51] Int. Cl.² ............................................. H01L 43/08
[52] U.S. Cl. .................................. 323/94 H; 324/46
[58] Field of Search .................... 307/309; 323/94 H; 324/45, 46; 338/32 R, 32 H

[56]         References Cited
          U.S. PATENT DOCUMENTS

| 3,112,464 | 11/1963 | Ratajski et al. | ...................... 338/32 H |
| 3,152,261 | 10/1964 | Carlstein | ................................ 324/45 X |
| 3,681,669 | 8/1972 | Ayers | .................................... 323/94 H |
| 3,934,160 | 1/1976 | Borcke | ................................ 338/32 R |

FOREIGN PATENT DOCUMENTS

| 1,665,574 | 2/1971 | Germany | .......................... 338/32 H |
| 448,836 | 8/1927 | Germany | .......................... 338/32 R |
| 1,490,684 | 10/1969 | Germany | .......................... 338/32 H |

OTHER PUBLICATIONS

Knox et al., "Reference Position Sensor", IBM TDB, vol. 5, No. 12, May 1963, p. 41.

Primary Examiner—A. D. Pellinen
Attorney, Agent, or Firm—Kenyon & Kenyon, Reilly, Carr & Chapin

[57]              ABSTRACT

In an arrangement for generating electrical signals by means of two magnetic field-dependent resistors (i.e., field plates) each comprised of a semiconductor compound and each arranged on a ferromagnetic extension fastened on the same pole of a permanent magnet, a particularly configured control element comprised of magnetically soft material is provided for varying the resistance values of the resistors through flux displacement. More particularly, the control element is shaped in the form of a spiral and is arranged on a nonmagnetic rotatable control cam in such a manner that, when the control cam rotates, a part of the spiral control element permeated by the flux of the magnet shifts from the one field plate to the other field plate. Such rotation thus changes the resistance values of the plates, thereby providing a change of the output signal of the arrangement.

2 Claims, 2 Drawing Figures

4,041,371

ARRANGEMENT FOR THE GENERATION OF ELECTRICAL SIGNALS BY MEANS OF MAGNETIC FIELD-DEPENDENT SEMICONDUCTOR COMPONENTS

BACKGROUND OF THE INVENTION

1. Field of the Invention

The present invention relates to an arrangement for generating of electrical signals by means of magnetic field-dependent components.

2. Description of the Prior Art

In a known generating arrangement there is provided on at least one pole of a magnet at least two magnetic field-dependent semiconductor components (i.e., field plates) which are each fastened on the magnet by respective pole pieces of magnetically soft iron. These two pole pieces serve to direct the magnetic flux and are arranged in a side by side relationship and at a predetermined spacing. This known generating arrangement also includes a control body of soft iron which serves to influence the magnetic flux being directed through the field plates.

In particular, as the control body moves parallel to the plane of the two field plates, and preferably in a direction transverse to the longitudinal dimension of the plates, the magnetic flux is caused to shift from one field plate to the other. Due to this flux distortion or shift, the resistances of the field plates are changed accordingly. These changes in resistance are then used in a conventional manner to generate an electrical signal. Specifically, one way of generating such a signal is to employ the field plates in the respective arms of a bridge circuit.

It is an object of the present invention to modify the above-described signal generating arrangement so as to realize a resultant arrangement which can be used in a wider variety of applications.

SUMMARY OF THE INVENTION

In accordance with the principles of the present invention, the above and other objectives are accomplished in an arrangement of the above-described type by forming the control element in the shape of a spiral and by arranging the element on a rotatable nonmagnetic control cam which, when rotated, causes a part of the control element permeated by the flux of the magnet to shift from one field plate to the other. More particularly, as the control cam rotates relative to the magnet and plates, the part of the spiral-shaped control element which is adjacent and above the field plates has an increased radius, thereby decreasing the control elements overlap of one field plate and increasing its overlap of the other field plate. The control element thus shifts the "captured" flux of the magnet from one plate to the other causing the resistance of the two plates to be changed in opposite directions. A predetermined angular position of the control cam can, therefore, be associated with corresponding resistance values of the two field plates. The circuit arrangement can, thus, be used as a sensitive angle transducer or position indicator.

BRIEF DESCRIPTION OF THE DRAWING

Further details and aspects of the invention will become apparent upon reading the following detailed description which makes reference to the accompanying drawings, in which.

DETAILED DESCRIPTION

Figure 1:
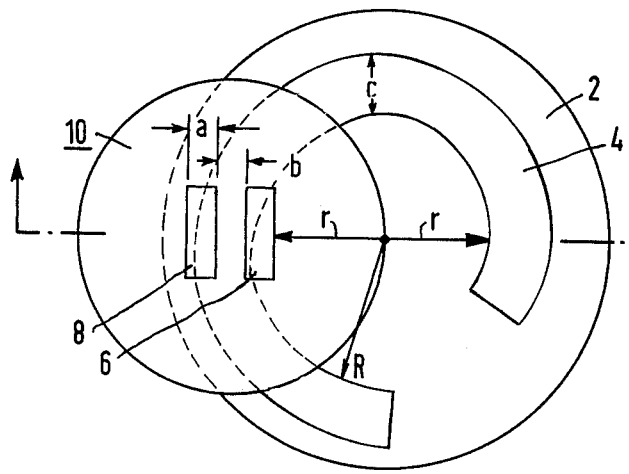
FIG. 1 shows a control element and field plates of an arrangement for generating electrical signals in accordance with the invention.

As shown in FIG. 1, the control element of the present invention comprises a rotatable control cam 2 upon which a spiral-shaped control element 4 of magnetically soft material is arranged. More specifically element 4 is arranged on cam 2 such that when cam 2 rotates about its axis, the part of element 4 which is to be permeated by the flux of a permanent magnet (i.e. the part of element 4 shown in dotted line) shifts from one field plate 6 to another field plate 8 of a magnetic circuit 10 which may, preferably, be cast in a self-hardening plastic material.

Advantageously, the width $a$ of the field plates 6 and 8 and the spacing $b$ between the two plates are chosen so that the sum of the width and the spacing is equal to the width $c$ of the control element 4. Additionally, the inner radius $r$ of the initial position of the control element 4 is chosen about equal to the distance of the field plate 6 from the axis the control cam 2. The inner radius $R$ of the final position of the control element 4, on the other hand, is selected to be approximately equal to the distance of the space between the two field plates 6 and 8 from the axis of the control cam. Thus, in the starting position of the control element 4, both the field plate 6 and the space between the field plates is covered or overlapped by the beginning portion of the control element 4, and, in the final position of the control element 4, the end portion thereof covers both the space between the field plates and the field plate 8.

Figure 2:
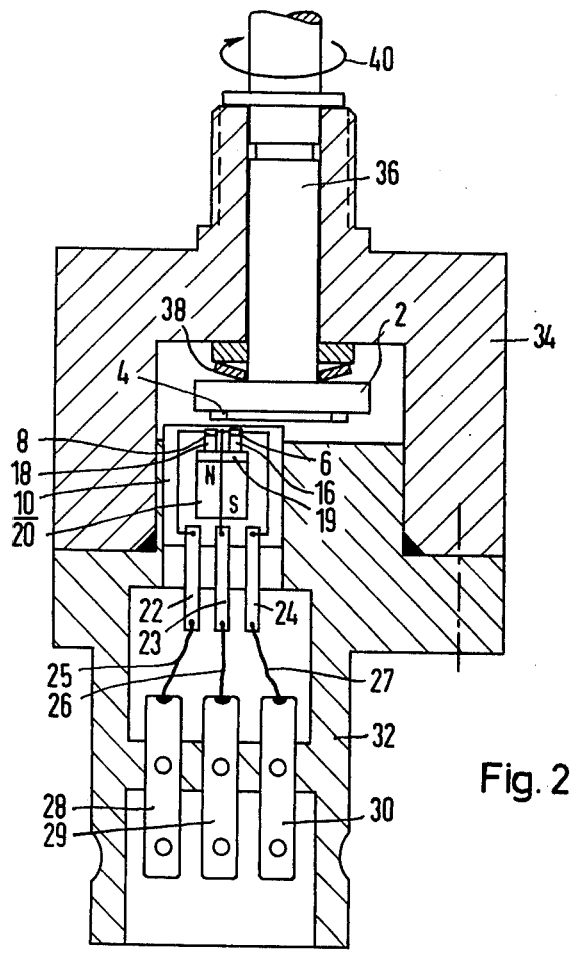
FIG. 2 shows, in cross section, details of the electrical generating arrangement in which the control element of FIG. 1 is to be used.

In FIG. 2, the arrangement of FIG. 1 is shown being used in an electrical signal generating arrangement having the form of an angle transducer. More specifically, as shown, the two field plates 6 and 8 are fastened, respectively, the pole pieces 16 and 18, each of which comprises a magnetically soft material and is fastened to the North pole of a permanent magnet 20 by means of an adhesive layer 19. The magnetic circuit 10 which, as above-indicated, is enclosed by a self-hardening plastic comprises electrical conductors (not shown in detail in the figure) which lead from the ends of the field plates 6 and 8 and from a center tap, to contact terminals. The lugs 22, 23 and 24 of these terminals are connected, via electrical connecting leads 25, 26 and 27, to corresponding electrodes 28, 29 and 30. The electrodes 28 to 30 are brought, in an electrically insulating manner, through a cover 32 which is connected, e.g. bolted, to a housing 34. In the housing 34, the drive shaft 36 of the control cam 2 is rotatably supported. In particular, cam 2 is supported on shaft 36 such that the control element 4 on the cam surface faces the magnetic circuit 10. Advantageously, a spring 38 may also be arranged between the control cam 2 and the housing 34.

As shown, the position of the control cam 2 is such that the part or portion of the control element 4 permeated by the flux of the magnet 20 is in an intermediate position relative to the field plates 6 and 8. If the shaft 36 is advanced or rotated in the direction indicated by the arrow 40, the part of the control element 4 being permeated by the flux shifts further to the field plate 8. Accordingly, continued rotation in this direction causes the field plate 8 to take on its maximum resistance value, and field plate 6 its minimum resistance value. If the shaft 36 is now rotated back from its end position in the opposite direction, the part of the control element 4 permeated by the flux shifts further to the field plate 6, and the resistances of the two field plates change in the opposite sense.

What is claimed is:

1. An arrangement for generating electrical signals comprising:
   a magnet;
   first and second pole pieces each comprised of magnetically soft material and each connected to one pole of said magnet;
   first and second magnetic field-dependent semiconductor components each of a first width and spaced apart a distance approximately equal to said first width connected to said first and second pole pieces, respectively;
   and means arranged to influence the flux of said magnet including:
   a rotatable control cam comprised of non-magentic material;
   and a spiral-shaped, magnetically soft control element of a constant width approximately equal to said first width plus said spaced distance arranged on said cam such that when said cam rotates a part of said control element permeated by the flux of said magnet is shifted from said first semiconductor component to said second semiconductor component.

2. An arrangement in accordance with claim 1 in which said element is arranged on said cam such that when said cam rotates the portion of said element permeated by the flux of said magnet and adjacent said components is caused to change the degree by which the portion overlaps each component.

* * * * *